(12) United States Patent
Kulkarni et al.

(10) Patent No.: US 11,415,019 B2
(45) Date of Patent: Aug. 16, 2022

(54) META-STABLE DETERGENT BASED FOAM CLEANING SYSTEM AND METHOD FOR GAS TURBINE ENGINES

(71) Applicant: GENERAL ELECTRIC COMPANY, Schenectady, NY (US)

(72) Inventors: Ambarish Jayant Kulkarni, Schenectady, NY (US); Bernard Patrick Bewlay, Schenectady, NY (US); Byron Andrew Pritchard, Jr., Cincinnati, OH (US); Nicole Jessica Tibbetts, Delanson, NY (US); Michael Edward Eriksen, Cincinnati, OH (US); Stephen Wilton, Cincinnati, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 540 days.

(21) Appl. No.: 14/967,043

(22) Filed: Dec. 11, 2015

(65) Prior Publication Data

US 2017/0167290 A1 Jun. 15, 2017

(51) Int. Cl.
*F01D 25/00* (2006.01)
*B08B 3/00* (2006.01)
(Continued)

(52) U.S. Cl.
CPC .......... *F01D 25/002* (2013.01); *B01F 23/235* (2022.01); *B01F 23/291* (2022.01);
(Continued)

(58) Field of Classification Search
CPC .......... F01D 25/002; B08B 9/00; B08B 3/02; B08B 3/003; B01F 3/04446; B01F 3/04992; B01F 5/0406; F02C 7/30
(Continued)

(56) References Cited

U.S. PATENT DOCUMENTS 3,037,887 A * 6/1962 Brenner .................. B08B 3/003
134/22.18
3,212,762 A * 10/1965 Carroll ...................... B05B 7/24
261/124
(Continued)

FOREIGN PATENT DOCUMENTS

CN 104785467 A 7/2015
DE 102008014281 A1 9/2009
(Continued)

OTHER PUBLICATIONS

On-wing washing system using injected water or detergent which penetrates deep into the engine, cleaning performance stealing contaminants, Aero Jet Wash, LLC. http://www.aerojetwash.com/services.html.
(Continued)

*Primary Examiner* — Michael E Barr
*Assistant Examiner* — Thomas Bucci
(74) *Attorney, Agent, or Firm* — Fitch, Even, Tabin & Flannery LLP (57) ABSTRACT

Embodiments in accordance with the present disclosure include a meta-stable detergent based foam generating device of a turbine cleaning system includes a manifold configured to receive a liquid detergent and an expansion gas, a gas supply source configured to store the expansion gas, and one or more aerators fluidly coupled with, and between, the gas supply source and the manifold. Each aerator of the one or more aerators comprises an orifice through which the expansion gas enters the manifold, and wherein the orifice of each aerator is sized to enable generation of a meta-stable detergent based foam having bubbles with bubble diameters within a range of 10 microns ($3.9 \times 10^{-4}$ inches) and 5 millimeters (0.2 inches), having a
(Continued)

half-life within a range of 5 minutes and 180 minutes, or a combination thereof.

20 Claims, 6 Drawing Sheets

(51) Int. Cl.
| | | |
|---|---|---|
| *B01F 23/235* | (2022.01) | |
| *B01F 23/20* | (2022.01) | |
| *B01F 25/31* | (2022.01) | |
| *B08B 9/00* | (2006.01) | |
| *F01D 21/00* | (2006.01) | |
| *F02C 7/22* | (2006.01) | |
| *F02C 7/264* | (2006.01) | |
| *B01F 101/24* | (2022.01) | |

(52) U.S. Cl.
CPC ..... *B01F 25/3111* (2022.01); *B01F 25/31114* (2022.01); *B08B 3/003* (2013.01); *F01D 21/003* (2013.01); *F02C 7/22* (2013.01); *F02C 7/264* (2013.01); *B01F 2101/24* (2022.01); *B08B 9/00* (2013.01); *F05D 2220/32* (2013.01); *Y02E 20/14* (2013.01)

(58) Field of Classification Search
USPC ......... 134/22.18, 169 A, 166 R, 22.1, 22.12; 15/320; 239/407, 311; 169/14
See application file for complete search history.

(56) References Cited

U.S. PATENT DOCUMENTS

| | | | |
|---|---|---|---|
| 3,436,262 A | 4/1969 | Crowe | |
| 4,065,322 A | 12/1977 | Langford | |
| 4,099,913 A | 7/1978 | Walter | |
| 4,133,773 A * | 1/1979 | Simmons | B08B 3/003 134/22.1 |
| 4,167,193 A * | 9/1979 | Magnus | F02B 77/04 239/70 |
| 4,170,489 A * | 10/1979 | Magnus | F01D 25/002 134/22.12 |
| 4,474,680 A | 10/1984 | Kroll | |
| 4,581,254 A | 4/1986 | Cunningham | |
| 4,644,014 A * | 2/1987 | Thomson | B29B 7/7438 521/68 |
| 4,730,676 A | 3/1988 | Luers | |
| 4,830,790 A | 5/1989 | Stevenson | |
| 4,899,825 A * | 2/1990 | Bosoni | B01F 25/31114 169/5 |
| 5,011,540 A | 4/1991 | McDermott | |
| 5,096,389 A * | 3/1992 | Grady | B01F 23/235 261/DIG. 26 |
| 5,102,228 A * | 4/1992 | Vine-Lott | B28C 5/386 366/132 |
| 5,213,263 A * | 5/1993 | Corona | B05B 7/0025 239/311 |
| 5,356,565 A | 10/1994 | Southwell | |
| 5,364,031 A | 11/1994 | Taniguchi | |
| 5,445,226 A | 8/1995 | Scott | |
| 5,582,776 A * | 12/1996 | Crawley | B01F 23/291 261/DIG. 26 |
| 5,613,773 A | 3/1997 | Scott | |
| 5,775,596 A | 7/1998 | Whisman | |
| 5,803,983 A * | 9/1998 | Simandl | B08B 9/00 134/22.12 |
| 5,837,168 A | 11/1998 | Rowe | |
| 5,970,574 A | 10/1999 | Thrash, Jr. | |
| D422,055 S | 3/2000 | Stasny et al. | |
| 6,077,081 A | 6/2000 | Dunn | |
| 6,118,000 A | 9/2000 | Frenier | |
| 6,310,022 B1 | 10/2001 | Amiran | |
| 6,311,074 B1 | 10/2001 | Lueders | |
| 6,311,704 B1 | 11/2001 | Foster | |
| 6,314,996 B1 * | 11/2001 | Borglum | A01B 69/022 366/181.8 |
| 6,357,532 B1 * | 3/2002 | Laskaris | B01F 35/2111 239/311 |
| 6,478,033 B1 * | 11/2002 | Foster | C11D 3/042 134/40 |
| 6,491,048 B1 | 12/2002 | Foster | |
| 6,503,334 B2 | 1/2003 | Ruiz et al. | |
| 6,521,028 B1 | 2/2003 | Frenier | |
| 7,033,135 B2 * | 4/2006 | Mortzheim | F02C 7/1435 415/115 |
| 7,033,979 B2 | 4/2006 | Herwig et al. | |
| 7,198,052 B2 * | 4/2007 | Watt | B08B 9/0321 134/29 |
| 7,445,677 B1 | 11/2008 | Asplund | |
| 7,454,913 B1 * | 11/2008 | Tassone | F01D 25/002 60/775 |
| 7,494,073 B2 | 2/2009 | Pivovarov | |
| 7,531,048 B2 | 5/2009 | Woodcock et al. | |
| 8,028,936 B2 | 10/2011 | McDermott | |
| 8,057,607 B2 | 11/2011 | Gardner et al. | |
| 8,277,647 B2 | 10/2012 | Rice et al. | |
| 8,308,869 B2 | 11/2012 | Gardner | |
| 8,524,011 B2 | 9/2013 | Gardner et al. | |
| 8,628,627 B2 | 1/2014 | Sales et al. | |
| 8,728,246 B2 | 5/2014 | Varrin, Jr. et al. | |
| 8,763,855 B1 | 7/2014 | Harvey et al. | |
| 8,871,090 B2 * | 10/2014 | Livshits | B08B 3/102 210/221.2 |
| 8,919,391 B1 | 12/2014 | Harvey et al. | |
| 9,074,830 B2 | 7/2015 | Moll et al. | |
| 9,138,782 B2 | 9/2015 | Dorshimer et al. | |
| 9,216,885 B1 | 12/2015 | Harvey | |
| 9,316,115 B2 | 4/2016 | Sales | |
| 9,359,168 B1 | 6/2016 | Moll | |
| 9,605,915 B2 | 3/2017 | Crock | |
| 9,624,113 B2 | 4/2017 | Kubala | |
| 9,739,168 B2 | 8/2017 | Ekanayake et al. | |
| 9,828,258 B2 | 11/2017 | Kubala | |
| 10,266,424 B2 | 4/2019 | Kubala | |
| 10,634,004 B2 | 4/2020 | Giljohann et al. | |
| 10,669,885 B2 | 6/2020 | Pecchiol et al. | |
| 2002/0129837 A1 | 9/2002 | Ruiz | |
| 2005/0217062 A1 * | 10/2005 | Field | A47L 11/4097 15/320 |
| 2006/0219269 A1 | 10/2006 | Rice et al. | |
| 2006/0280690 A1 | 12/2006 | Wright | |
| 2007/0000528 A1 * | 1/2007 | Asplund | B08B 9/00 134/169 R |
| 2008/0087300 A1 | 4/2008 | Kohler | |
| 2009/0084411 A1 | 4/2009 | Woodcock | |
| 2010/0024842 A1 | 2/2010 | Kholodenko | |
| 2010/0031977 A1 * | 2/2010 | Sales | B05B 7/166 134/39 |
| 2010/0242490 A1 | 9/2010 | Symonds | |
| 2011/0042108 A1 * | 2/2011 | Hiebert | B01F 25/31423 261/119.1 |
| 2013/0118763 A1 * | 5/2013 | Pace | B01F 35/8311 169/46 |
| 2013/0330172 A1 * | 12/2013 | Scipio | F01D 25/002 137/15.01 |
| 2014/0026481 A1 * | 1/2014 | Podmajersky | A01G 31/04 47/62 N |
| 2014/0034091 A1 | 2/2014 | Dorshimer et al. | |
| 2014/0102179 A1 | 4/2014 | Ekanayake | |
| 2014/0124007 A1 | 5/2014 | Scipio | |
| 2014/0144473 A1 | 5/2014 | William | |
| 2015/0056066 A1 | 2/2015 | Ekanayake | |
| 2015/0083165 A1 | 3/2015 | Moliere | |
| 2015/0122153 A1 | 5/2015 | Warner | |
| 2015/0285094 A1 | 10/2015 | Tibbetts et al. | |
| 2015/0354403 A1 | 12/2015 | Ekanayake | |
| 2015/0354404 A1 * | 12/2015 | Ekanayake | C11D 3/162 134/102.1 |
| 2016/0032761 A1 | 2/2016 | Griffiths | |
| 2016/0067750 A1 | 3/2016 | Griffiths | |
| 2016/0090859 A1 | 3/2016 | Aggas | |

(56) References Cited

U.S. PATENT DOCUMENTS

| | | | |
|---|---|---|---|
| 2016/0160679 A1 | 6/2016 | Griffiths | |
| 2017/0165721 A1 | 6/2017 | Tibbetts et al. | |
| 2017/0167290 A1 | 6/2017 | Kulkarni | |
| 2020/0040763 A1 | 2/2020 | Wang | |
| 2020/0248583 A1 | 8/2020 | Kulkarni | |

FOREIGN PATENT DOCUMENTS

| | | | | |
|---|---|---|---|---|
| DE | 102013202616 B4 | 10/2015 | | |
| DE | 102015006330 B4 | 8/2019 | | |
| JP | 2007063998 A | 3/2007 | | |
| JP | 2007-314463 A | 12/2007 | | |
| JP | 2014-080977 A | 5/2014 | | |
| JP | 2014-80977 A | 5/2014 | | |
| JP | 2015-148226 A | 8/2015 | | |
| WO | 2015/051146 A1 | 4/2015 | | |
| WO | 2015051146 A1 | 4/2015 | | |
| WO | WO-2015051146 A1 | * | 4/2015 | .......... B01F 11/0225 |

OTHER PUBLICATIONS

Engine Washing, Aviation Today, Oct. 1, 2006. http://www.aviationtoday.com/regions/ca/Engine-Washing_5248.html#.Vmszu78vuhu.

"The Leader in Industrial Cleaning," HydroChem, Retrieved from Internet URL: http://web.archive.org/web/20150730002645/http://www.hydrochem.com/, pp. 1-8 (Apr. 17, 2016).

"Turbine Services," Hydrochem, Retrieved from Internet URL: https://www.hydrochem.com/services/turbine-services, pp. 1-3 (Feb. 12, 2018).

Notification of Reasons for Refusal issued in connection with corresponding JP Application No. 2016-233757 dated Dec. 5, 2017.

Office Action issued in connection with corresponding TW Application No. 105139091 dated Jun. 7, 2018 (English Translation not available).

Fry, J.F., et al.; "A Mechanical Foam-Generator for Use in Laboratories"; J. appl. Chem.; Oct. 1951; vol. 1; pp. 425-429.

Massoudi, R., et al.; "Effect of Pressure on the Surface Tension of Water. Adsorption of Low Molecular Weight Gases on Water at 25.deg."; The Journal of Physical Chemistry; Oct. 1974; vol. 78, Issue 22; pp. 2262-2266.

Pallas, N.R., et al.; "The Surface Tension of Water"; Colliods and Surfaces; 1983; vol. 6; Elsevier Scientific Publishing Company; Amsterdam, the Netherlands; pp. 221-227.

Weast, Robert C.; "Handbook of Chemistry and Physics"; A Ready-Reference Book of Chemical and Physical Data; 1974-1975; 55th Edition; CRC Press, Inc.; Cleveland, Ohio; pp. 1-3.

Hydrochem; "Turbine Services"; <http://www.hydrochem.com/services/turbine-services>; Jun. 10, 2016; pp. 1-5; retrieved from Internet Archive Wayback Machine <http://web.archive.org/web/20160610191041/http:/www.hydrochem.com/services/turbine-services> on Mar. 14, 2022.

Hydrochem; <http://www.hydrochem.com/>; Sep. 29, 2015; pp. 1-8; retrieved from Internet Archive Wayback Machine <http://web.archive.org/web/20150929025618/http://www.hydrochem.com/> on Mar. 14, 2022.

Bikerman, J.J.; "Foams: Theory and Industrial Applications"; 1953; Reinhold Publishing Corporation; New York, New York; retrieved from Internet Archive Wayback Machine <https://archive.org/details/unset0000unse_e1d3> on Mar. 14, 2022; Library of Congress # 53008705.

Bikerman, J.J.; "Foams"; 1973; Springer, Berlin, Heidelberg; https://doi.org/10.1007/978-3-642-86734-7; 344 pages.

MTU Aero Engines; "REPORT"; 2006-2007; Munich, Germany; <https://www.yumpu.com/en/document/read/11154856/download-pdf-265-mb-mtu-aero-engines>; 20 pages.

Weingartner, Stefan; "Commercial MRO Growth Platforms"; Investor and Analyst Day 2011, MTU Aero Engines; Nov. 22, 2011; London; <https://www.yumpu.com/en/document/read/5323071/pdf-4-mb-mtu-aero-engines>; 11 pages.

MTU Aero Engines; "Investor and Analyst Day 2010, MTU Aero Engines"; Nov. 9, 2010; <https://www.yumpu.com/en/document/read/11154901/investor-and-analyst-day-2010-mtu-aero-engines>; 80 pages.

MTU Aero Engines; "Annual Report 2010, United by Excellence"; <https://www.mtu.de/fileadmin/EN/5_Investor_Relations/7_Financial_Reports/Archiv/2010/investor_relations_reports_2010_geschaeftsbericht_en.pdf>; 272 pages.

* cited by examiner

META-STABLE DETERGENT BASED FOAM CLEANING SYSTEM AND METHOD FOR GAS TURBINE ENGINES

BACKGROUND

The subject matter disclosed herein relates to a cleaning system and method for a turbine system or engine (e.g., an aircraft engine) and, more specifically, to a meta-stable detergent based foam cleaning system and method.

Gas turbine engines (e.g., aircraft engines), or turbine systems, typically combust a mixture of carbonaceous fuel and compressed oxidant to generate high temperature, high pressure combustion gases. The combustion gases drive a turbine, which is coupled via a shaft to a compressor. In some embodiments, the shaft may also be coupled to an electrical generator. Accordingly, as the combustion gases drive the turbine and corresponding shaft into rotation, the shaft outputs power to the electrical generator. In aircraft engines, the combustion gases may pass through the turbine and through a nozzle, causing that the exhaust gas exiting the nozzle produces thrust.

Unfortunately, turbine systems are generally susceptible to deposits or contaminants, such as dust in particular, which may reduce efficiency and/or effectiveness of the turbine system. Generally, the deposits and contaminants may be formed or may gather in any component of the gas turbine engine, including but not limited to the compressor, the combustor or combustion chamber, and the turbine. Unfortunately, cleaning systems and methods may be unnecessarily cumbersome and lengthy, respectively, often requiring at least partial disassembly of the gas turbine engine. Additionally or alternatively, cleaning systems and methods may be inadequate to fully remove the deposits or contaminants (e.g., dust) within the gas turbine engine and/or may require lengthy cleaning processes. Accordingly, improved cleaning systems and methods are needed for gas turbine engines.

BRIEF DESCRIPTION

In one embodiment, a meta-stable detergent based foam generating device of a turbine cleaning system includes a manifold configured to receive a liquid detergent and an expansion gas, a gas supply source configured to store the expansion gas, and one or more aerators fluidly coupled with, and between, the gas supply source and the manifold. Each aerator of the one or more aerators comprises an orifice through which the expansion gas enters the manifold, and wherein the orifice of each aerator is sized to enable generation of a meta-stable detergent based foam having bubbles with bubble diameters within a range of 10 microns ($3.9 \times 10^{-4}$ inches) and 5 millimeters (0.2 inches), having a half-life within a range of 5 minutes and 3 hours (180 minutes), or a combination thereof.

In a second embodiment, a method of cleaning an engine includes delivering a meta-stable detergent based foam to the engine, soaking the engine with the meta-stable detergent based foam until the meta-stable detergent based foam decomposes, and rinsing the engine to remove the decomposed meta-stable detergent based foam.

In a third embodiment, a meta-stable detergent based turbine engine cleaning apparatus includes one or more mixing chambers configured to receive a detergent and a gas. The cleaning apparatus also includes a detergent supply source fluidly coupled with one or more mixing chambers and configured to deliver the detergent to the one or more mixing chambers, and a gas supply source fluidly coupled with one or more aerators. The gas supply source is configured to deliver the gas through the one or more aerators to the one or more mixing chambers such that the one or more aerators causes the gas to mix with the detergent within the one or more mixing chambers to generate a meta-stable detergent based foam. The cleaning apparatus also includes one or more foam outlets fluidly coupled with the one or more mixing chambers, configured to receive the meta-stable detergent based foam from the one or more mixing chambers, and configured to deliver the meta-stable detergent based from the one or more mixing chambers to a turbine engine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure relates to meta-stable detergent based foam cleaning system for a gas turbine system (e.g., a gas turbine engine, such as an aircraft engine). The cleaning system includes a foaming nozzle having a foam chamber that receives a detergent (e.g., a liquid based detergent). The cleaning system also includes multiple aerators in fluid communication with the foam chamber of the foaming nozzle. An aerating gas (e.g., air) is routed through the aerators and into the foam chamber to aerate the detergent. In some embodiments, a surfactant and/or additives may also be routed to the foam chamber of the foaming nozzle.

As the aerating gas aerates the detergent (e.g., liquid detergent), foaming occurs. Specifically, in accordance with embodiments of the present disclosure, a meta-stable detergent based foam is generated within the foam chamber. The term "meta-stable detergent based foam" as used herein relates to a foam having particular characteristics, including at least one of a desired half-life and a desired bubble diameter of the bubbles of the meta-stable detergent based foam. The desired half-life and/or the desired bubble diameter may be enabled by configuration of components of the cleaning system, such as a size of the orifices of the aerators through which the aerating gas is routed, the type, amount, pressure, or flow rate of the detergent used, the type, amount, pressure, or flow rate of the aerating gas used, the addition of surfactants and/or additives, and other factors described in detail below with reference to the figures. It should also be noted that, in general, the "meta-stable detergent based foam" in accordance with the present disclosure may fully collapse (e.g., back to the volume of the materials used to generate the foam prior to generation of the foam) within 3 hours of the time the foam is generated, or in some embodiments within 5 hours of the time the foam is generated.

In accordance with the present disclosure, "meta-stable detergent based foam" refers to a foam having a half-life of between 5 minutes and 180 minutes (3 hours) and/or having bubbles with a bubble diameter of between 10 microns ($3.9 \times 10^{-4}$ inches) and 5 millimeters (0.2 inches). However, depending on the embodiment in accordance with the present disclosure, the foam generating apparatus, as described in detail below, may be configured to generate the meta-stable detergent based foam such that the bubble diameters are between 20 microns ($7.9 \times 10^{-4}$ inches) and 4 millimeters (0.2 inches), between 30 microns ($1.2 \times 10^{-3}$ inches) and 3 millimeters (0.1 inches), between 40 microns ($1.6 \times 10^{-3}$ inches) and 2 millimeters ($7.8 \times 10^{-2}$ inches), or between 50 microns ($1.2 \times 10^{-3}$ inches) and 1 millimeter ($3.9 \times 10^{-2}$ inches). Further, depending on the embodiment in accordance with the present disclosure, the foam generating apparatus, as described in detail below, may be configured to generate the meta-stable detergent based foam such that the half-life is between 10 minutes and 60 minutes, 15 minutes and 50 minutes, or 20 minutes and 40 minutes.

In general, "half-life" in accordance with the present disclosure refers to the amount of time it takes the meta-stable detergent based foam to collapse to half of the foam's initial volume after generation of the foam. Other foam characteristics, which may be related to half-life, bubble size, or both, include foam quality (e.g., the ratio of gas volume to total volume of the foam), and foam viscosity. In general, the meta-stable detergent based foam includes a foam quality of 85 percent or greater. Further, the meta-stable detergent based foam may include a foam viscosity of between 0.5 centipoise and 100 centipoise.

The characteristics of the "meta-stable detergent based foam" used herein enable desired cleaning characteristics of the disclosed cleaning system and method. For example, after the meta-stable detergent based foam is generated, the meta-stable detergent based foam is delivered to one or more locations of the gas turbine system. The bubble diameter may ensure that the meta-stable detergent based foam is deliverable to, and through, each of the one or more locations of the gas turbine system, and through an inner fluid passageway or volume of the gas turbine engine. For example, the bubble diameters may be sized such that the bubbles are capable of flowing through small passageways associated with the cleaning system, the passageway from the cleaning system to the turbine system, and within the turbine system (e.g., within recesses and passageways thereof). In other words, the bubble diameters may be sized, in accordance with the present disclosure, such that the bubbles do not collapse (e.g., decay, decompose, etc.) prior to cleaning of the turbine system.

The half-life may ensure that the meta-stable detergent based foam remains stable for a desired soaking period of time (e.g., a desired amount of time needed to clean the turbine system). The foam quality may reduce an amount of detergent needed to clean the turbine system. The foam viscosity may ensure, as described above, that the meta-stable detergent based foam is deliverable to, and through, each of the one or more locations of the gas turbine system, and through an inner fluid passageway or volume of the gas turbine engine.

After routing (e.g., blowing, pumping, etc.) the meta-stable detergent based foam to the turbine system, the meta-stable detergent based foam soaks the turbine system to remove deposits or other contaminants within the turbine system. As the soaking period of time approaches the half-life of the meta-stable detergent based foam, the foam may collapse (e.g., decompose), thereby removing the deposits and other contaminants from surfaces of the gas turbine engine. A rinsing agent (e.g., water, or additional foam) may be routed through the fluid passageway having the collapsed foam to rinse the collapsed foam and depositions/contaminants from the fluid passageway. The rinsing agent (e.g., water, or additional foam) may be provided via hoses that route the rinsing agent to the same one or more locations of the gas turbine engine through which the meta-stable detergent based foam is routed into the turbine system. Indeed, in some embodiments, the same routing mechanisms utilized to route the meta-stable detergent based foam into the gas turbine system may be utilized to route the rinsing agents, which may be additional foam, water, or some other rinsing agent(s), into the gas turbine system.

Figure 1:
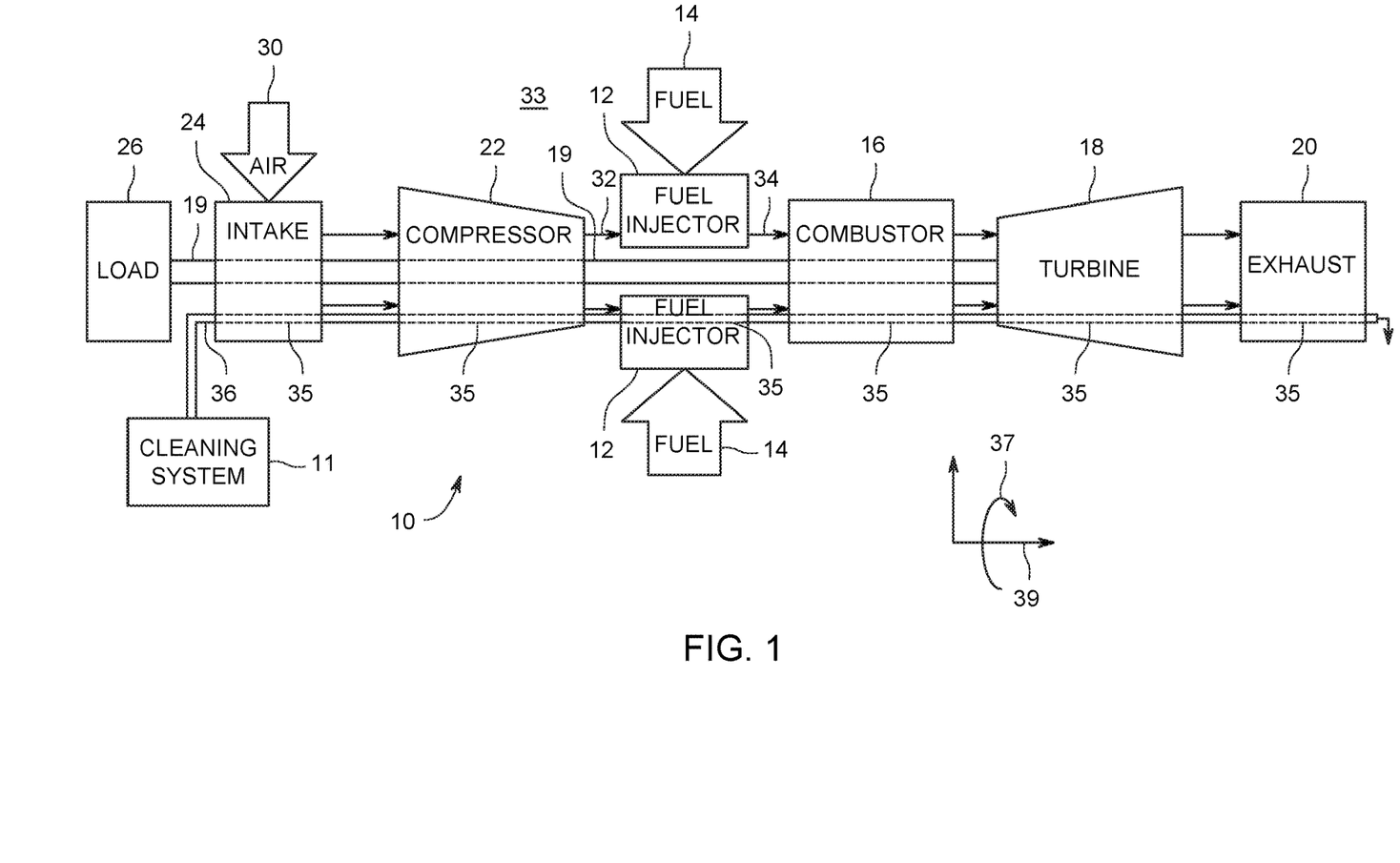
FIG. 1 is a cross-sectional schematic view of an embodiment of a turbine system and a cleaning system, in accordance with an aspect of the present disclosure.

Turning now to the drawings, FIG. 1 is a block diagram of a turbine system 10 and a cleaning system 11 (shown in greater detail in FIG. 3) configured to clean the turbine system 10. The turbine system 10 includes a fuel injector 12, a fuel supply 14, a combustor 16, and a turbine 18. As illustrated, the fuel supply 14 routes a liquid fuel and/or gas fuel, such as natural gas, to the gas turbine system 10 through the fuel injector 12 and into the combustor 16. As discussed below, the fuel injector 12 is configured to inject and mix the fuel with compressed air. The combustor 16 ignites and combusts the fuel-air mixture, and then passes hot pressurized exhaust gas into the turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

The turbine system 10 may be susceptible to gathering of deposits or contaminants, namely dust, within components of the turbine system 10. Accordingly, as illustrated, the turbine system 10 includes the cleaning system 11 fluidly coupled to at least one component of the turbine system 10, namely, the air intake(s) 24, the compressor 22, the fuel injector(s) 12, the combustor(s) 16, the turbine 18, and/or the exhaust outlet 20. In some embodiments, the cleaning system 11 may be physically coupled to only one component or one group of components of the gas turbine system 10, such as to the air intake or intakes 24, or to the compressor 22. For example, although the components of the turbine system 10 are shown separate from one another in the illustrated embodiment, the components may be integral with each other or coupled together such that a fluid passageway 35 extends through inner portions of all the components. The fluid passageway 35 may be substantially continuous through the components and/or may be at least partially sealed from an environment 33 outside the gas turbine system 10. Although the fluid passageway 35 is shown on only a bottom portion of the illustrated gas turbine system 10, the fluid passageway 35 may be an annular passageway extending in an annular direction 37 about a longitudinal direction 39 (or axis) of the gas turbine system 10. The cleaning system 11 may be physically coupled to one of the components (e.g., a first of the components, such as the air intake[s] 24 or the compressor 22) at an inlet 36, such that the cleaning system 11 is fluidly coupled to the fluid passageway 35 at the inlet 36. It should be noted that, in some embodiments, the cleaning system 11 may include a delivery system or manifold that is coupled to a number of inlets to the gas turbine system 10 (e.g., an engine inlet). For example, the delivery system or manifold of the cleaning system 11 may deliver cleaning agents (e.g., a meta-stable detergent based foam), as described below, to inlets of the gas turbine system 10 (e.g., engine inlets) and to other inlets that are also used for borescope injection, as fuel injection nozzles, for igniter plugs, or any other suitable inlets. Further, by way of introducing the meta-stable detergent based foam to the fluid passageway 35 through one or more inlets to the fluid passageway 35 (e.g., through borescope inspection ports, through igniter plug inlets, through fuel nozzles, etc.) the meta-stable detergent based foam may pass over compressor blades, compressor vanes, through the compressor, through and/or outside of the turbine, and through cooling circuits of the turbine system 10.

The cleaning system 11 in FIG. 1 is configured to generate, and provide to the component(s) of the gas turbine system 10, a meta-stable detergent based foam that loosens, soaks, absorbs, and/or cleans the deposits or contaminants, namely dust, within the components of the gas turbine system 10. The cleaning system 11 may also include components configured to rinse the gas turbine system 10 after the meta-stable detergent based foam soaks the insides of the components of the gas turbine system 10 for a defined period of time. As will be appreciated in light of the discussion below, components of the cleaning system 11 may be configured to generate a meta-stable detergent based foam having particular characteristics that enable desired cleaning effects of the turbine 18. For example, the cleaning system 11 may generate and provide to the gas turbine system 10 a meta-stable detergent based foam having a desired half-life, a desired bubble size, or both, thereby causing the meta-stable detergent based foam to soak the gas turbine system 10 for a desired period of time and with a desired effectiveness, as described below. Other foam characteristics, which may be related to half-life, bubble size, or both, include foam quality (e.g., the ratio of gas volume to total volume), and foam viscosity. In general, the cleaning system 11 is configured to enable a foam quality of 85 percent or greater. In some embodiments, the cleaning system 11 is configured to enable a foam quality of approximately 95 percent or greater. The cleaning system 11 is also configured to enable a foam viscosity of between 0.5 centipoise and 100 centipoise.

Figure 2:
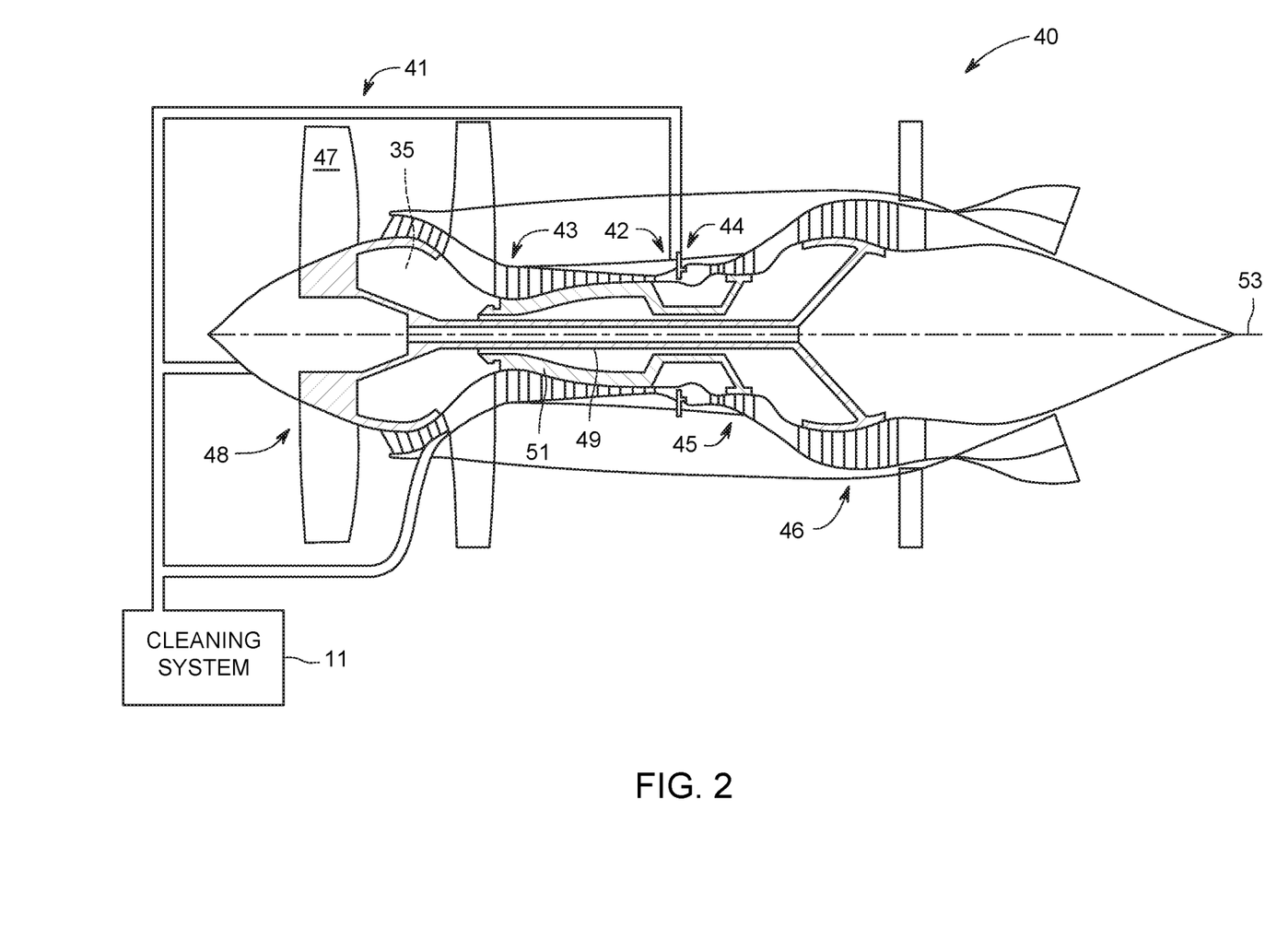
FIG. 2 is a cross-sectional schematic view of an embodiment of an aircraft gas turbine system and a cleaning system, in accordance with an aspect of the present disclosure.

FIG. 2 illustrates a cross-sectional schematic view of an embodiment of the cleaning system 11 and an aircraft gas turbine engine 40 (e.g., aeroderivative gas turbine engine) that includes a fan assembly 41 and a core engine 42 including a high pressure compressor 43, a combustor 44, a high-pressure turbine (HPT) 45, and a low-pressure turbine (LPT) 46. The illustrated aircraft gas turbine engine 40 may be an example of the gas turbine engine 10 illustrated in FIG. 1. In the illustrated embodiment, the fan assembly 41 of the gas turbine engine 40 (e.g., aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flow (not shown) from the combustor 44 drives the turbines 45 and 46. The HPT 45 drives the compressor 43 by way of the shaft 51, and the LPT 46 drives the fan assembly 41 by way of the shaft 49. Moreover, in operation, foreign material, such as mineral dust, is ingested by the gas turbine engine 40 along with the air, and the foreign material accumulates on surfaces therein.

Figure 3:
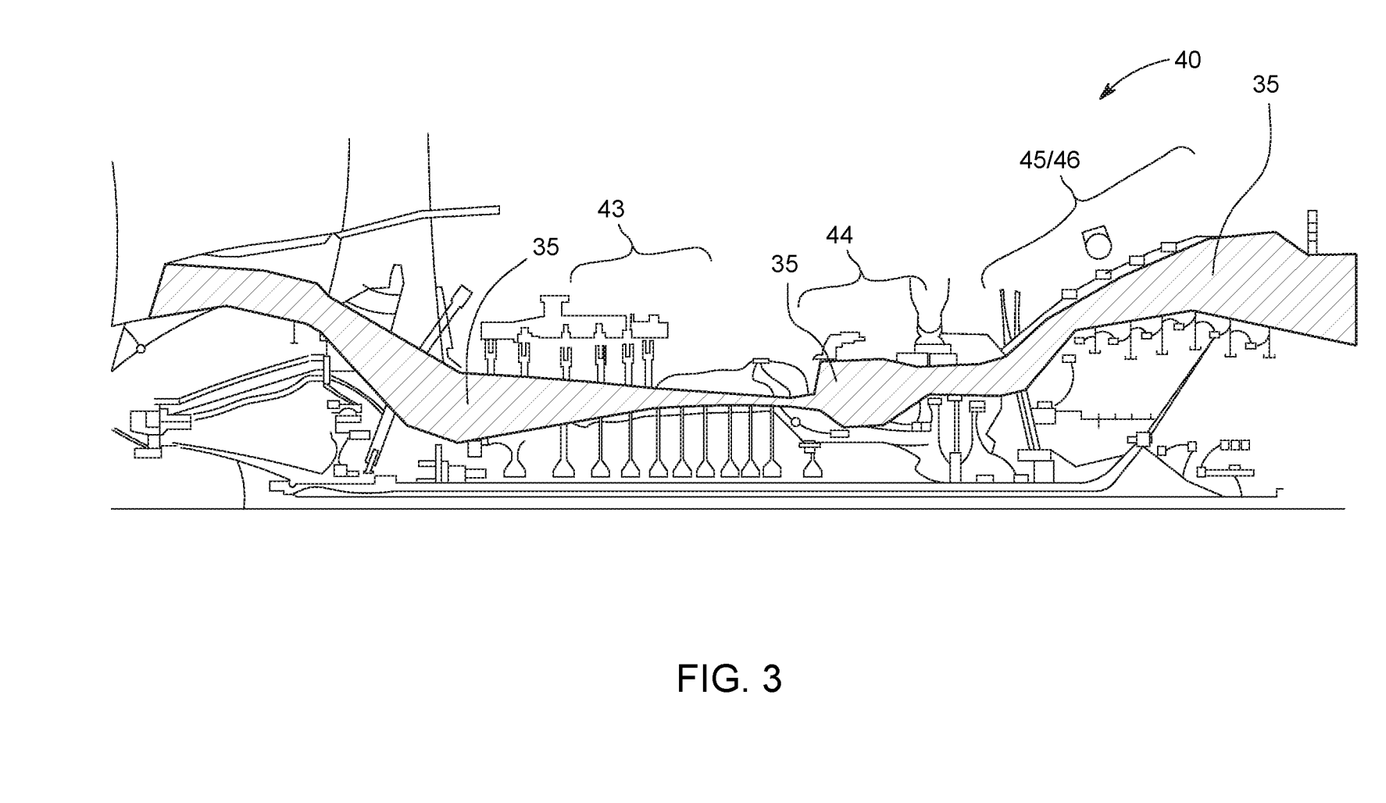
FIG. 3 is a cross-sectional schematic view of an embodiment of a cleaning volume or fluid passageway of the turbine system of FIG. 2, in accordance with an aspect of the present disclosure

As shown, the cleaning system 11 supplies the cleaning agent (e.g., the meta-stable detergent based foam) to a number of inlets to the gas turbine engine 40 (e.g., to the fluid passageway 35 thereof). An example of an embodiment of the fluid passageway 35 extending continuously through various components of the gas turbine engine 40 of FIG. 2 (e.g., through at least the compressor 43, the combustor 44, and the turbine stages 44, 45) is shown in FIG. 3. As shown in FIG. 3, the cleaning system 11 may inject or enable flow of the meta-stable detergent based foam into the fluid passageway 35 along multiple locations of the gas turbine engine 40. The inlets to the fluid passageway 35 may include inlets used for other purposes, such as inlets for borescope inspections, as inlets for fuel manifold nozzles. It should also be noted that the cleaning system 11 may be utilized for cleaning the fluid passageway 35 of any gas turbine engine 40 (e.g., including the turbine system 10 of FIG. 1) in accordance with presently described embodiments.

Figure 4:
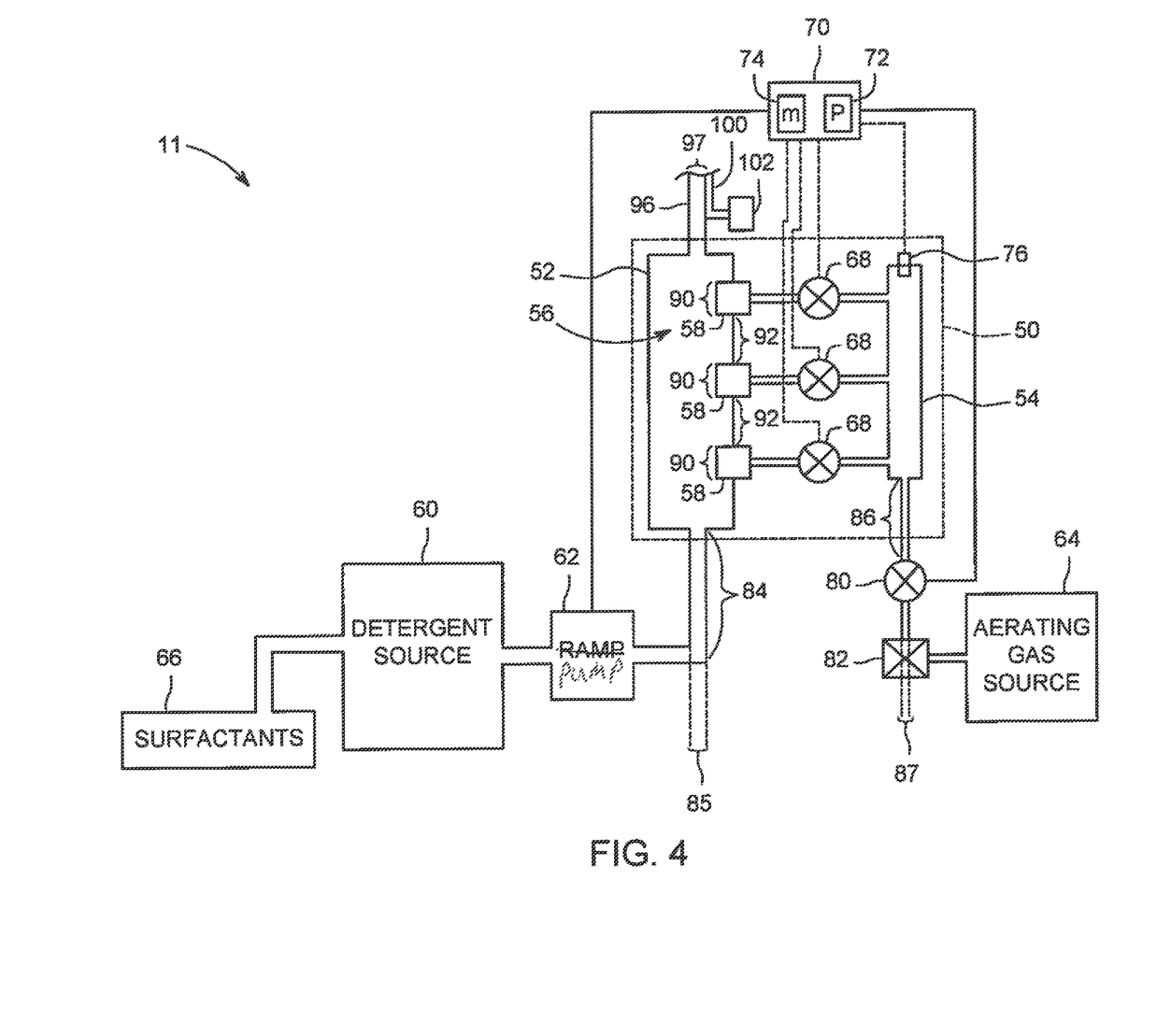
FIG. 4 is a cross-sectional schematic view of an embodiment of a meta-stable detergent based foam generating system for cleaning the turbine system of FIG. 2, in accordance with an aspect of the present disclosure.

FIG. 4 illustrates a cross-sectional schematic view of an embodiment of the cleaning system 11 for cleaning the gas turbine system 10 and/or the aircraft gas turbine engine 40 of FIGS. 1 and 2, respectively. In the illustrated embodiment, the cleaning system 11 includes a foam generating manifold 50 having a foaming nozzle 52 and an aerating gas manifold 54. The foaming nozzle 52 includes a foam chamber 56 (e.g., reservoir or mixing chamber) within the foaming nozzle 52 and multiple aerators 58 fluidly coupled with the foam chamber 56. The foam chamber 56 is also fluidly coupled with a detergent source 60 that supplies detergent (e.g., liquid detergent) to the foam chamber 56.

The detergent may, for example, be citric acid based. In one embodiment, the detergent may include the following formulation: 0.21 weight percent citric acid, 0.21 weight percent glycolic acid, 0.14 weight percent isopropylamine sulphonate, 0.07 weight percent alcohol ethoxylate, and 0.07 weight percent triethanol amine, and the balance of the cleaning solution is water. The total amount of active agents in the final regant may be 0.7 weight percent. Sodium lauriminodipropionate, as a corrosion inhibitor, commercially available as BASOCOR®, may be added at a level of 0.03 weight percent. The detergent may be supplemented with an organic base, Imidazole, with the formula $(CN)_2N(NH)CH$ in the crystalline form added by weight to titrate to a final pH of 5.5. It should be noted that many other suitable detergents may be used in accordance with present embodiments, and that the above described embodiment describes only one possible solution.

The citric acid based detergent described above may be used to target types of dust that accumulate within components of the turbine system 10 or 40, but without stripping away materials of the components of the turbine system 10 or 40. For example, the dust may be a "mineral dust," or naturally occurring granular material that includes particles of various rocks and minerals. For example, the mineral dust may be capable of becoming airborne at sub-38 microns in size, and accumulate in the turbine engine (e.g., 10 or 40) during taxi, take-off, climb, cruise, landing, as well as when the turbine engine (e.g., 10 or 40) is not in operation. The elemental composition and phases within the accumulated mineral dust varies based on a location of the mineral dust within sections of the turbine engine (e.g., 10 or 40), and/or the operational environment (e.g., including geographical location of use) of the turbine engine (e.g., 10 or 40). For example, increased temperatures in the high pressure turbine section caused by combustion result in increased temperatures on surfaces of the components therein. As such, mineral dust on the surfaces thermally react to form CMAS-based reaction products (e.g., $[(Ca,Na)_2(Al,Mg,Fe^{2+})(Al,Si)SiO_7]$), and subsequent layers of mineral dust accumulate on the surface of the reaction products.

The cleaning system 11 described herein generates the meta-stable detergent based foam with a cleaning solution that facilitates removing the mineral dust (and similar dusts) described above. For example, the cleaning system 11 targets oxide-based, chloride-based, sulfate-based, and carbon-based constituents of the CMAS-based reaction products, interstitial cement, and the subsequent layers of accumulated mineral dust from the turbine components. More specifically, the cleaning solution includes a reagent composition that selectively dissolves the constituents of the foreign material in the internal passages of the turbine engine.

As previously described, the reagent composition may include the following formulation: 0.21 weight percent citric acid, 0.21 weight percent glycolic acid, 0.14 weight percent isopropylamine sulphonate, 0.07 weight percent alcohol ethoxylate, and 0.07 weight percent triethanol amine, and the balance of the cleaning solution is water. The total amount of active agents in the final regant may be 0.7 weight percent. Sodium lauriminodipropionate, as a corrosion inhibitor, commercially available as BASOCOR®, may be added at a level of 0.03 weight percent. The detergent may be supplemented with an organic base, Imidazole, with the formula $(CN)_2N(NH)CH$ in the crystalline form added by weight to titrate to a final pH of 5.5.

Continuing with the illustrated cleaning system 11, a pump 62 disposed between the detergent source 60 and the foaming nozzle 52 may pump the detergent from the detergent source 60 to the foam chamber 56 within the foaming nozzle 52. As (or after) the foam chamber 56 receives the detergent, the aerating gas manifold 54 supplies an aerating gas (e.g., air, hydrocarbons, nitric oxide, carbon dioxide, or other gases) to the aerators 58, whereby the aerators 58 aerate the detergent via the aerating gas. More specifically, the aerating gas manifold 54 may receive the aerating gas from an aerating gas source 64 that stores the aerating gas in a compressed state (e.g., at pressures of between 2 and 1000 pounds per square inch [psi]).

As the aerating gas is supplied to the foam chamber 56 through the aerators 58, the aerating gas causes the detergent (e.g., supplied to the foam chamber 56 via the detergent source 60 and detergent pump 62) to expand or bubble. The bubbles are formed such that walls of the bubbles are closed and contain (or "carry") a portion of the detergent. The detergent may also be contained (or "carried") between bubbles of the meta-stable detergent based foam.

In some embodiments, a surfactant is included in (e.g., delivered to) the foam chamber 56 to enhance formation and/or effectiveness of the meta-stable detergent based foam. For example, as shown, a surfactant source 66 is fluidly coupled with the detergent source 60. Thus, the surfactant source 66 supplies the detergent source 60 with the surfactant. In other embodiments, the detergent source 60 may store the detergent and the surfactant without a separate surfactant source 66. Further, in some embodiments, the surfactant may be injected or routed into the foam chamber 56 separately from the detergent. In general, the surfactant may be included to stabilize the foam generated by the cleaning system 11, specifically by reducing a surface tension of the liquid based detergent. In other words, certain detergents may benefit from surfactants because, without the surfactants, the detergent's surface tension may be too high for foaming to occur or for foaming having desired characteristics to occur. Accordingly, surfactants may be utilized to reduce the surface tension. However, in some embodiments, the detergent may already include a surface tension ideal for foaming to achieve the ideal foam characteristics.

Additives may also be included with, or separately from, the surfactants. For example, additives such as secondary alcohol ethoxylates or glycol may be delivered to the foam chamber 56 with the detergent, surfactant, or both, or separately from the detergent, surfactant, or both. The additives may act as a stiffening agent to promote creation of the bubbles. It is generally desirable to utilize organic wall thickening agents, such that they can be easily removed from the engine and in order to minimize inorganic residue within the turbine. Other additives may also be used, such as gelatin, carboxamers, or other gel-based species to increase an ability of the meta-stable detergent based foam to stick to components within the turbine system.

In addition to the system components set forth above, the cleaning system 11 may include control components configured to enable formation of the foam having the ideal characteristics described above (e.g., ideal half-life, ideal bubble diameter, etc.). For example, pressure regulators 68 may be disposed between the aerators 58 and the aerating gas manifold 54. The pressure regulators 68 may be configured to regulate a pressure, amount, or flow rate of the aerating gas delivered to each aerator 58. The pressure regulators 68 may be communicatively coupled with a controller 70 having a processor 72 and a memory 74. Instructions may be stored on the controller's 70 memory 74, and the instructions, when executed by the processor 72, may cause the controller 70 to instruct the pressure regulators 68 and other components of the cleaning system 11 to operate in certain ways.

For example, a pressure sensor 76 disposed on the aerating gas manifold 54 may be communicatively coupled to the controller 70. Alternatively, one pressure sensor 76 for each pressure regulator 68 may be disposed on (or in) the fluid passageways extending between the aerating gas manifold 54 and the aerators 58. The controller 70 may receive pressure measurements from the one or more pressure sensors 76 and, based on the pressure measurements, may instruct the pressure regulators 68 to open a certain extent or close a certain extent to change a pressure, amount, or flow rate of the aerating gas supplied to one or more of the aerators 58.

Additionally or alternatively, another pressure regulator 80 may be disposed upstream of the aerating gas manifold 54 (e.g., between the aerating gas manifold 54 and the aerating gas source 64). The pressure regulator 80 is communicatively coupled with the controller 70, and may be instructed by the controller 70 to open a certain extent or close a certain extent to regulate a pressure, amount, or flow rate of the aerating gas delivered to the aerating gas manifold 54. For example, as previously described, the aerating gas may be stored in a compressed state in the aerating gas source 64. The pressure regulator 80 may be instructed to open such that the compressed aerating gas is delivered from the aerating gas source 64 to the aerating gas manifold 54. For example, the pressure regulator 80 may enable the aerating gas to be delivered from the aerating gas source 64 to the aerating gas manifold 54 at a flow rate of between 0.1 and 500 standard cubic feet per hour (SCFH). The pressure regulator 80 may be instructed, by the controller 70, to enable a particular flow rate based, in accordance with the description below, on a number of aerating gas manifolds 54 disposed downstream of the pressure regulator 80. For example, in certain embodiments, multiple aerating gas manifolds 54 may be disposed downstream of the aerating gas source 64. In such embodiments, the aerating gas source 64 may feed a larger amount of aerating gas through the pressure regulator 80, such that each of the multiple aerating gas manifolds 54 receives sufficient aerating gas. Additionally or alternatively, the above described pressure regulators 68 (as instructed by the controller 70) may also be configured to enable a flow rate of between 0.1 and 500 SCFH.

Additionally or alternatively, a shut off valve 82 may be disposed between, and in fluid communication with, the aerating gas source 64 and the aerating gas manifold 54. The shut off valve 82 in the illustrated embodiment is communicatively coupled with the controller 70, and may be instructed by the controller 70 to block fluid flow of the aerating gas to the aerating gas manifold 54. Additionally or alternatively, the pump 62 described above may be communicatively coupled to the controller 70, whereby the controller 70 instructs the pump 62 to pump the detergent from the detergent source 60 during certain operating conditions (e.g., when the foaming nozzle 52 is being operated to generate the foam). The pump 62 may provide a desired amount (or pressure) of the detergent to the foam chamber 56 to enable generation of the meta-stable detergent based foam.

As shown in the illustrated embodiment, only one foaming nozzle 52 and one aerating gas manifold 54 is disposed downstream of the detergent source 60 and the aerating gas source 64, respectively. However, in another embodiment, the detergent source 60 and the aerating gas source 64 may be fluidly coupled with multiple foaming nozzles 52 and aerating gas manifolds 54, respectively. For example, as shown, a detergent flow path 84 extends between the pump 62 and the foaming nozzle 52. The detergent flow path 84 in the illustrated embodiment may be a tube having a width or diameter 85 of, for example, one inch or less (e.g., ¾ inch [19 millimeters], ½ inch [12.7 millimeters], ¼ inch [6.4 millimeters]). However, in another embodiment, a manifold may be disposed within the detergent flow path 82, where the manifold fluidly couples with multiple foaming nozzles 52. Further, as shown, an aerating gas flow path 86 extends between the pressure regulator 80 and the aerating gas manifold 54. The aerating gas flow path 86 in the illustrated embodiment may be a tube having a width or diameter 87 of, for example, one inch or less (e.g., ¾ inch [19 millimeters], ½ inch [12.7 millimeters], ¼ inch [6.4 millimeters]). However, in another embodiment, a manifold may be disposed within the aerating gas flow path 86, where the manifold fluidly couples with multiple aerating gas manifolds 54. Thus, the cleaning system 11 may encompass multiple foam generating manifolds 50 fluidly coupled with the same detergent source 60 and aerating gas source 64, each foam generating manifold 50 having one foaming nozzle 52 and one aerating gas manifold 54.

As previously described, in embodiments where the detergent source 60 and the aerating gas source 64 supply detergent and aerating gas, respectively, to multiple foaming nozzles 52 and aerating gas manifolds 54, respectively, the controller 70 may instruct the pump 62 and the pressure regulator 80 to supply more detergent and aerating gas. Further, the control enabled by the communication between the controller 70 and the pressure regulator 80 may enable selective operation of certain foam generating manifolds 50. In other words, when multiple foam generating manifolds 50 are disposed downstream of the detergent source 60 and the aerating gas source 64, certain of the multiple foam generating manifolds 50 may be selective operated, and the pump 62 and the pressure regulator 80 may be controlled by the controller 70 to supply appropriate amounts of detergent and aerating gas, respectively, based on the number of foam generating manifolds 50 in operation. By way of non-limiting example, if one foam generating manifold 50 is being operated to clean an engine volume of 18 cubic feet (0.51 cubic meters), the detergent flow rate toward the foam chamber 56 may be less than 0.3 liters per minute, less than 0.2 liters per minute, or less than 0.1 liters per minute. The aerating gas flow rate through the pressure regulator 80 may then be less than 4 SCFH, less than 3 SCFH, or less than 2.5

SCFH. However, if for example twelve foam generating manifolds 50 are being operated to clean an engine flow volume of 18 cubic feet (0.51 cubic meters), the detergent flow rate toward the foam chamber 56 may be less than 3.6 liters per minute, less than 2.4 liters per minute, or less than 1.2 liters per minute. The aerating gas flow rate through the pressure regulator 80 may then be less than 48 SCFH, less than 36 SCFH, or less than 30 SCFH.

As previously described, the illustrated cleaning system 11 is configured to generate a meta-stable detergent based foam for cleaning a turbine system (e.g., the gas turbine system 10 or the aircraft gas turbine engine 40 of FIGS. 1 and 2, respectively). As the meta-stable detergent based foam is generated in the foam chamber 56, the meta-stable detergent based foam is pushed or pulled through a passageway 96 (e.g., toward and into the turbine system 10 or 40) having a cross-sectional width 97 (e.g., diameter) of one inch or less (e.g., ¾ inch [19 millimeters], ⅝ inch [15.9 millimeters], ½ inch [12.7 millimeters], ⅜ inch [9.5 millimeters], ¼ inch [6.4 millimeters]). It should be noted, however, that more than one passageway 96 may be included in a foam delivery system (e.g., foam delivery manifold), such that the meta-stable detergent based foam may be delivered to the turbine system 10 (e.g., of FIG. 1) or to the gas turbine engine 40 (e.g., of FIG. 2) through more than one inlet to the turbine system 10 or 40. For example, the meta-stable detergent based foam may be routed into multiple inlets of the turbine system 10 or 40, where each inlet may also be used for other purposes (e.g., as inlets for borescope inspections, as inlets for fuel manifold nozzles, etc.). Multiple delivery points may enable delivery of the meta-stable detergent based foam to a larger volume of the turbine system 10 or 40 (e.g., of FIG. 1 or 2, and as shown in FIG. 3). In general, the meta-stable detergent based foam is delivered into the turbine system 10 or 40 (e.g., of FIG. 1 or 2) at approximately 90 degrees Celsius.

It should also be noted that the mechanism may which the meta-stable detergent based foam is pulled, blown, or sucked through the turbine system 10 (or the turbine system 40) may include a blower, a fan, a pump, or any other flow regulating mechanism (e.g., the pump 62) fluidly coupled with the cleaning system 11 (e.g., with the passageway[s] 96) and/or the turbine system 10 or 40 (e.g., of FIG. 1 or 2). Accordingly, the flow regulating mechanism may regulate the flow of the meta-stable detergent based foam, which may include pulsing of the meta-stable detergent based foam. The pulsing by the flow regulating mechanism, as described in detail below with reference to later figures, may cause the meta-stable detergent based foam to reach areas (e.g., recesses) of the turbine system 10 or the turbine system 40 (e.g., of FIGS. 1 and 2, respectively) that would otherwise not be reached or would otherwise be difficult to reach.

As used herein, and as described above, the term "meta-stable detergent based foam" relates to a detergent based foam (e.g., where foam means a mass of fine bubbles) having a half-life within a range of 5 minutes and 180 minutes (3 hours), having bubbles with bubble diameters within a range of 10 microns ($3.9 \times 10^{-4}$ inches) and 5 millimeters (0.2 inches). However, depending on the embodiment in accordance with the present disclosure, the foam generating apparatus (e.g., of the cleaning system 11) may be configured to generate the meta-stable detergent based foam such that the bubble diameters are between 20 microns ($7.9 \times 10^{-4}$ inches) and 4 millimeters (0.2 inches), between 30 microns ($1.2 \times 10^{-3}$ inches) and 3 millimeters (0.1 inches), between 40 microns ($1.6 \times 10^{-3}$ inches) and 2 millimeters ($7.8 \times 10^{-2}$ inches), or between 50 microns ($1.2 \times 10^{-3}$ inches) and 1 millimeter ($3.9 \times 10^{-2}$ inches). Further, depending on the embodiment in accordance with the present disclosure, the foam generating apparatus may be configured to generate the meta-stable detergent based foam such that the half-life is between 10 minutes and 60 minutes, 15 minutes and 50 minutes, or 20 minutes and 40 minutes.

The characteristics of the meta-stable detergent based foam (e.g., the half-life and/or the bubble diameter described above) enable the meta-stable detergent based foam to travel the turbine system and soak the turbine system for a suitable or optimal period of time. The characteristics (e.g., the half-life and/or the bubble diameter described above), and the use of the foam in general, may reduce a volume of detergent needed to clean the turbine system. The characteristics may also enable all of the components (e.g., that are intended to be cleaned) of the turbine system to be cleaned substantially simultaneously. As described in detail below, components of the cleaning system 11 may be configured to enable the above-described characteristics (e.g., half-life, bubble diameter, foam quality, and/or foam viscosity) of the meta-stable detergent based foam, in accordance with the present disclosure.

For example, each aerator 58 may include a diameter 90 sized to enable the characteristics of the meta-stable detergent based foam. Further, a distance 92 between adjacent aerators 58 may be sized to enable the characteristics of the meta-stable detergent based foam. It should be noted that the diameters 90 of the aerators 58 may all be equal or some or all of the diameters 90 may differ. Further, the distances 92 between the adjacent aerators 58 may all be the same, or some or all of the distances 92 may differ. Further still, a number of the aerators 58 fluidly coupled to the foam chamber 56 of the foaming nozzle 52 may be configured to enable the characteristics of the meta-stable detergent based foam. For example, 1, 2, 3, 4, 5, 6, or more aerators 58 may be included. In the illustrated embodiment, three aerators 58 are used. The aerators 58 may include diameters 90 between 0 and 1 inch (0 and 25.4 millimeters), 0.25 and 0.75 inches (6.4 and 19 millimeters), or 0.4 and 0.6 inches (10.2 and 15.2 millimeters). The distances 92 between adjacent aerators 58 (i.e., from a middle of one aerator 58 to a middle of an adjacent aerator 58) may be between 0 and 1 inch, 0.25 and 0.75 inches, or 0.4 and 0.6 inches.

Other aspects of the cleaning system 11 may also be configured to enable the characteristics of the meta-stable detergent based foam. For example, the pressure regulators 68, 80 may be operated (e.g., by the controller 70) to supply the aerating gas at a desired pressure configured to enable the characteristics of the meta-stable detergent based foam. Further, the pump 62 may be operated (e.g., by the controller 70) to supply the detergent (and, in some embodiments, surfactant[s] and/or additive[s]) at a desired amount (or pressure).

After the meta-stable detergent based foam is generated, the meta-stable detergent based foam is delivered to the turbine system. In one implementation, the meta-stable detergent based foam soaks the turbine system for the half-life of the meta-stable detergent based foam. The meta-stable detergent based foam may then collapse (e.g., decomposes, or become unstable). As the meta-stable detergent based foam collapses, the collapsed foam may take the deposits and other contaminants off inner surfaces of the turbine system 10. The collapsed foam and contaminants may then be rinsed from the fluid passageway 35 (e.g., of FIG. 3) by a rinser 100 of the cleaning system 11. For example, the rinser 100 may be proximate to the passageway 100 through which the meta-stable detergent based foam is transported to the fluid passageway 35 (e.g., of FIG. 3) of the turbine system. The rinser 100 may be fluidly coupled to a rinsing source 102 which is configured to contain the rinsing agent (e.g., water).

A process flow diagram illustrating a method 110 of generating a meta-stable detergent based foam, via a cleaning system, is shown in FIG. 4. In the illustrated embodiment, the method 110 includes routing (block 112) a detergent (e.g., liquid based detergent) into a foam chamber of a foaming nozzle. In some embodiments, routing the detergent into the foam chamber of the foaming nozzle may also include routing a surfactant, an additive, or both into the foam chamber. The surfactant and/or additive may be routed into the foam chamber together with the detergent, or separately from the detergent. As previously described, the surfactant may be included to reduce a surface tension of the detergent, thereby enabling formation of a meta-stable detergent based foam in accordance with the description below. The additive(s) may be included as a stiffening agent, to enhance stickness' of the meta-stable detergent based foam, or both. Further, as previously described, a pump may be utilized to route the detergent, surfactant, and/or additive from a detergent source to the foam chamber. The same pump, or a different pump or component, may be utilized to route the surfactant and/or additive into the foam chamber, if the surfactant and/or additive is included.

The method 110 also includes routing (block 114) an aerating gas (e.g., air) to a number of aerators fluidly coupled with the foam chamber of the foaming nozzle. For example, as previously described, the aerating gas may be stored in a compressed state in an aerating gas source. One or more pressure regulators (e.g., valves) may be controllably operated by a controller to enable the compressed aerating gas to be delivered from the aerating gas source to the number of aerators, which may disposed together within, as a part of, or fluidly coupled downstream of an aerating gas manifold that distributes the aerating gas to each of the plurality of aerators. Further, additional pressure regulators (e.g., valves) may be disposed between the aerating gas manifold and the number of aerators (e.g., one regulator per aerator), such that the controller may controllably operate each of the additional pressure regulators (e.g., valves) to manipulate or cause a certain gas pressure of the aerating gas delivered to each aerator of the plurality of aerators.

The method 110 also includes routing (block 116) the aerating gas (e.g., air) through the plurality of aerators and into the foam chamber to aerate the detergent to generate a meta-stable detergent based foam. For example, each aerator may include a flow path through which the aerating gas is routed, and an orifice disposed between the flow path and the foam chamber. In other words, the orifice may be disposed within, or directly fluidly coupled with, the foam chamber. The orifice may be sized to enable the aerating gas to be delivered to the foam chamber at a particular pressure, velocity, or mass flow rate. As previously described, the pressure, velocity, or mass flow rate of the aerating gas may be controlled (e.g., by appropriately configuring the orifice size, by appropriately configuring the flow path size of the aerator, by controlling the pressure regulators of the system, etc.) to enable aeration of the detergent such that a meta-stable detergent based foam is formed, in accordance with the description of the meta-stable detergent based foam above.

Other characteristics or components of the cleaning system may also be configured to enable the generation of the meta-stable detergent based foam. For example, the foam chamber may be sized and/or otherwise configured to enable the generation of the meta-stable detergent based foam. The type of detergent (e.g., the type of liquid based detergent) may be selected to enable a chemical formulation that causes generation of the meta-stable detergent based foam. The amount or pressure of detergent may be included to enable generation of the meta-stable detergent based foam. The type and/or amount or pressure of the additive may be included to enable a chemical formulation that causes generation of the meta-stable detergent based foam. In general, the cleaning system is configured to generate the meta-stable detergent based foam in accordance with the method 110 described in FIG. 4, such that the meta-stable detergent based foam includes a half-life of between 5 minutes and 180 minutes (3 hours), includes bubbles having bubble diameters between 10 microns ($3.9 \times 10^{-4}$ inches) and 5 millimeters (0.2 inches), or both. However, depending on the embodiment in accordance with the present disclosure, the foam generating apparatus (e.g., of the cleaning system 11) may be configured to generate the meta-stable detergent based foam such that the bubble diameters are between 20 microns ($7.9 \times 10^{-4}$ inches) and 4 millimeters (0.2 inches), between 30 microns ($1.2 \times 10^{-3}$ inches) and 3 millimeters (0.1 inches), between 40 microns ($1.6 \times 10^{-3}$ inches) and 2 millimeters ($7.8 \times 10^{-2}$ inches), or between 50 microns ($1.2 \times 10^{-3}$ inches) and 1 millimeter ($3.9 \times 10^{-2}$ inches). Further, depending on the embodiment in accordance with the present disclosure, the foam generating apparatus may be configured to generate the meta-stable detergent based foam such that the half-life is between 10 minutes and 60 minutes, 15 minutes and 50 minutes, or 20 minutes and 40 minutes.

Figure 5:
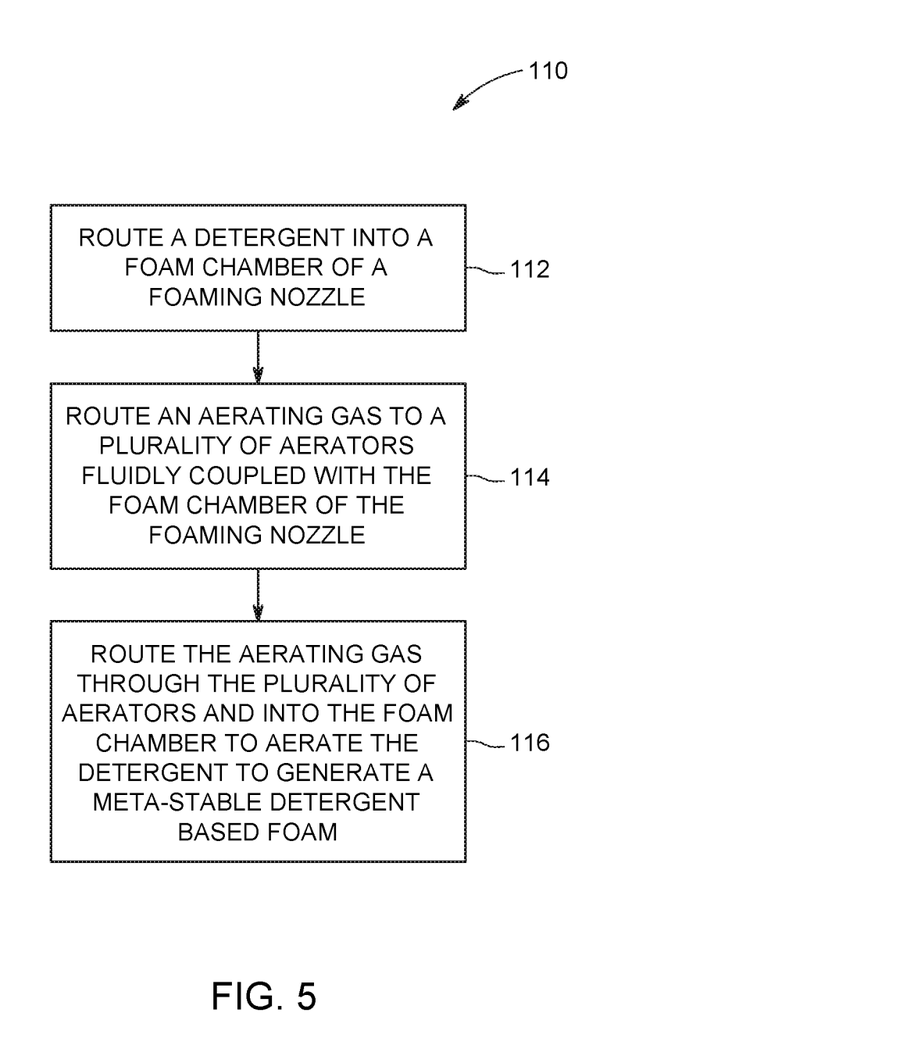
FIG. 5 is a process flow diagram illustrating a method of generating a meta-stable detergent based foam for a gas turbine cleaning system, in accordance with an aspect of the present disclosure.
Figure 6:
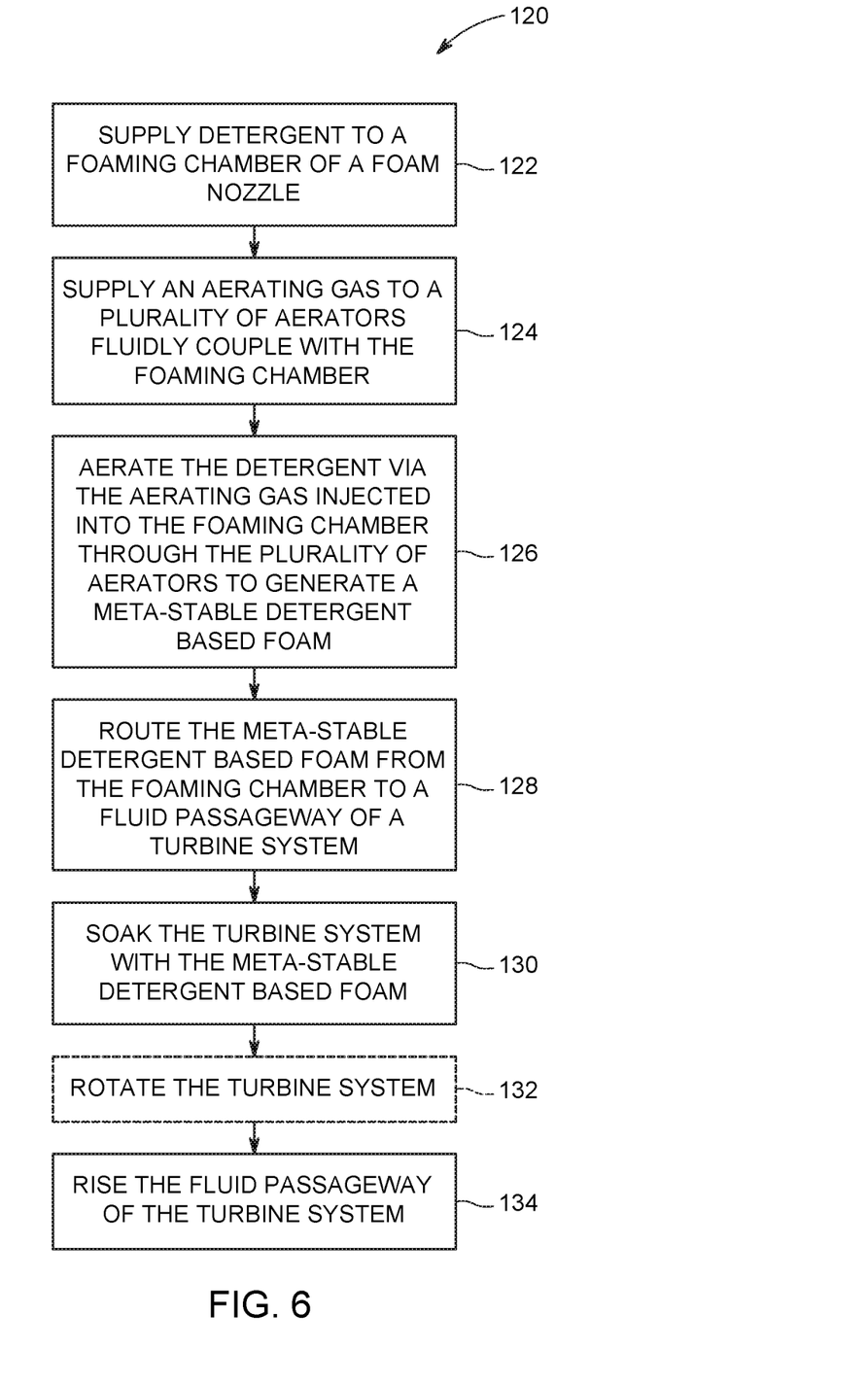
FIG. 6 is a process flow diagram illustrating a method of cleaning a turbine system, via a cleaning system, with a meta-stable detergent based foam, in accordance with an aspect of the present disclosure.

A process flow diagram illustrating a method 120 of cleaning a turbine system with a meta-stable detergent based foam, via a cleaning system, is shown in FIG. 5. For example, the method 120 includes generating the meta-stable detergent based foam. More specifically, to generate the meta-stable detergent based foam, the method 120 includes supplying (block 122) a detergent to a foaming chamber of a foam nozzle. Further, to generate the meta-stable detergent based foam, the method 120 includes supplying (block 124) an aerating gas to a plurality of aerators fluidly coupled with the foaming chamber, and aerating (block 126) the detergent via the aerating gas injected into the foaming chamber through the plurality of aerators, in accordance with the description of the method 110 described in FIG. 4.

Continuing with the illustrated method 120, cleaning the turbine system with the meta-stable detergent based foam includes pumping or otherwise routing (block 128) the meta-stable detergent based foam from the foaming chamber to a fluid passageway of the turbine system. As previously described, the fluid passageway may extend through multiple components of the turbine system. Thus, the meta-stable detergent based foam may be routed to the multiple components of the turbine system. For example, the fluid passageway may extend through at least a compressor, a combustor, and a turbine of the turbine system. In some embodiments, the fluid passageway may also extend through an air intake of the turbine system, fuel injectors of the turbine system, and/or any other component of the turbine system. Further, in some embodiments, the fluid passageway may extend through only one component of the turbine system, such as the turbine.

In some embodiments, the routing (block 128) of the meta-stable detergent based foam described above, to and through the fluid passageway of the turbine system, may include pulsing or otherwise regulating the flow of the meta-stable detergent based foam. In other words, a pump, blower, or some other flow mechanism (e.g., suction mechanism) of the cleaning system may be utilized to pulse or regulate the flow of the meta-stable detergent based foam to and through the fluid passageway. By pulsing or otherwise regulating the flow of the meta-stable detergent based foam through the fluid passageway, the cleaning system may enable improved reach of the meta-stable detergent based foam. In other words, pulsing may cause the meta-stable detergent based foam to reach areas of the turbine system that would otherwise be more difficult (e.g., take more time) to reach. Further, in some embodiments, controlled suction may be applied (e.g., through inlets or outlets of the turbine system) to the interior of the turbine system, causing selective flow of the meta-stable detergent based foam therein.

Further, in some embodiments, the routing (block 128) of the meta-stable detergent based foam described above includes routing liquid tracers within the meta-stable detergent based foam. The liquid tracers may be added to the detergent (e.g., prior to generation of the meta-stable detergent based foam), or the liquid tracers may be added to the meta-stable detergent based foam during or after generation of the meta-stable detergent based foam. In general, the liquid tracers enable tracing of where the meta-stable detergent based foam travels within the turbine system. Other materials, conditions, or parameters, such as temperature (e.g., of the meta-stabled detergent based foam within the turbine system) may also be used to track locations of the meta-stable detergent based foam during cleaning.

The method 120 also includes soaking (block 130) the turbine system with the meta-stable detergent based foam. For example, the meta-stable detergent based foam may soak the turbine system from within the fluid passageway. The meta-stable detergent based foam may soak the turbine system for a soaking period of time. The soaking period of time may be a function of, or related to, the half-life of the meta-stable detergent based foam. Put differently, the half-life of the meta-stable detergent based foam may be designed to correspond with a desired soaking period of time of the method 120. In other words, the cleaning system may be configured to generate the meta-stable detergent based foam having the prescribed half-life described in detail above such that the meta-stable detergent based foam soaks the turbine system for the soaking period of time. As the meta-stable detergent based foam soaks the turbine system, the meta-stable detergent based foam may collapse as the soaking period of time approaches and/or exceeds the half-life of the meta-stable detergent based foam. In other words, the cleaning system may be configured to enable a particular half-life such that the half-life corresponds with the amount of time desired for cleaning (e.g., the soaking period of time).

The method 120 of cleaning the turbine system also includes rinsing (block 134) the fluid passageway of the turbine system. For example, as (or after) the meta-stable detergent based foam collapses, the deposits and/or other contaminants within the turbine system may be absorbed and carried away, by the collapsing (or collapsed) foam, from walls of the turbine system. A rinsing agent (e.g., water) may be routed through the fluid passageway to rinse the collapsed foam and the contaminants from the fluid passageway. The rinsing agent may be routed to the fluid passageway via a nozzle, hose, or other component of the cleaning system or via a nozzle, hose, or some other component separate from the cleaning system.

It should be noted that, in some embodiments, the method 120 includes rotating (block 132) the turbine system (or particular components thereof). Rotating the turbine system may be done while the meta-stable detergent based foam is routed to and through the fluid passageway (e.g., such that the meta-stable detergent based foam is better distributed through the turbine system), which may cause the meta-stable detergent based foam to reach areas of the turbine system that would not otherwise be reached, or that would otherwise be difficult (e.g., take a longer period of time) to reach. Additionally or alternatively, the turbine system may be rotated while the meta-stable detergent based foam soaks the turbine system form within the fluid passageway (e.g., such that the meta-stable detergent based foam is better distributed through the turbine system). Additionally or alternatively, the turbine system may be rotated while the fluid passageway of the turbine system is rinsed (e.g., such that the collapsed foam and the contaminants are better removed from the fluid passageway).

In accordance with the present disclosure, the meta-stable detergent based foam generated by the disclosed cleaning system includes the half-life of between 5 minutes and 180 minutes (3 hours) and bubbles with the bubble diameter of between 10 microns ($3.9 \times 10^{-4}$ inches) and 5 millimeters (0.2 inches). The cleaning system is configured, in accordance with the description above, to enable the above described characteristics. The half-life and bubble diameter characteristics of the meta-stable detergent based foam enable certain technical effects, such as desired cleaning characteristics. For example, after the meta-stable detergent based foam is generated, the meta-stable detergent based foam is delivered to one or more locations of the gas turbine system. The bubble diameter may ensure that the meta-stable detergent based foam is deliverable to, and through, each of the one or more locations of the gas turbine system, and through an inner fluid passageway or volume of the gas turbine engine. The half-life may ensure that the meta-stable detergent based foam remains stable for a desired soaking period of time (e.g., a desired amount of time needed to clean the turbine system), and then collapses after the desired soaking period of time lapses (e.g., to reduce an amount of time needed to clean the turbine system), or begins to collapse as the desired soaking period of time approaches. The foam quality may reduce an amount of detergent needed to clean the turbine system. Other characteristics enabled by the configuration of the cleaning system, such as desired foam quality and desired foam viscosity, may also be beneficial. The foam viscosity may ensure, as described above, that the meta-stable detergent based foam is deliverable to, and through, each of the one or more locations of the gas turbine system, and through an inner fluid passageway or volume of the gas turbine engine.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine cleaning system, comprising:
a foaming nozzle comprising a foam chamber configured to receive a liquid detergent;
a manifold configured to receive an expansion gas;
a gas supply source configured to store the expansion gas;
one or more aerators fluidly coupled with the gas supply source, the foam chamber, and the manifold, wherein each aerator of the one or more aerators is configured to pass the expansion gas to the foam chamber, and wherein each aerator comprises a diameter between 0.25 and 0.75 inches; and
one or more pressure regulators, wherein each of the one or more aerators is operably coupled to a respective pressure regulator of the one or more pressure regulators, such that each of the one or more aerators is configured to generate a meta-stable detergent based foam having bubbles with bubble diameters within a range of 10 microns and 5 millimeters, having a half-life within a range of 5 minutes and 180 minutes, or a combination thereof;
one or more pressure sensors configured to measure pressure of the expansion gas that is supplied to the one or more aerators; and
a controller configured to receive output from the one or more pressure sensors and configured to control operation of the one or more pressure regulators based on the output of the one or more pressure sensors.

2. The turbine cleaning system of claim 1, wherein the one or more aerators comprises two or more aerators, wherein adjacent aerators of the two or more aerators are spaced apart by one inch or less such that the two or more aerators are configured to generate the meta-stable detergent based foam having the bubbles with the bubble diameters within the range of 10 microns and 5 millimeters, having the half-life within the range of 5 minutes and 180 minutes, or a combination thereof.

3. The turbine cleaning system of claim 1, wherein the controller is further configured to control an amount of the expansion gas supplied to the manifold, an amount or a pressure of the liquid detergent supplied to the manifold, or a combination thereof, such that the turbine cleaning system is configured to generate the meta-stable detergent based foam having the bubbles with the bubble diameters within the range of 10 microns and 5 millimeters, having the half-life within the range of 5 minutes and 180 minutes, or a combination thereof.

4. The turbine cleaning system of claim 1, further comprising:
one or more foam outlets fluidly coupled with the foam chamber and configured to receive the meta-stable detergent based foam from the foam chamber and configured to deliver the meta-stable detergent based foam from the foam chamber to a turbine engine through at least an engine inlet of the turbine engine.

5. The turbine cleaning system of claim 1, further comprising a liquid detergent supply source that comprises a liquid detergent storage tank configured to store the liquid detergent; and
at least one pump configured to pump the liquid detergent from the liquid detergent storage tank to the foam chamber; and wherein the gas supply source comprises a gas storage tank configured to store the expansion gas, wherein the one or more pressure regulators are configured to deliver the expansion gas from the gas storage tank to the one or more aerators at a preferred pressure, such that the one or more aerators provide the expansion gas to the foam chamber at the preferred pressure to aerate the liquid detergent within the foam chamber, thereby generating the meta-stable detergent based foam.

6. The turbine cleaning system of claim 4, wherein the one or more foam outlets are sized to enable passage of the meta-stable detergent based foam having the bubbles comprising the diameters within the range of 10 microns and 5 millimeters.

7. The turbine cleaning system of claim 4, wherein the one or more foam outlets are configured to deliver the meta-stable detergent based foam from the foam chamber to the turbine engine through at least one of a borescope inspection port, an igniter plug, or a fuel nozzle.

8. The turbine cleaning system of claim 1, wherein the meta-stable detergent based foam has a foam quality of 85 percent or greater, a foam viscosity of between 0.5 centipoise and 100 centipoise, or a combination thereof.

9. The turbine cleaning system of claim 1, comprising a detergent source configured to store the liquid detergent and to pass the liquid detergent to the foaming nozzle, wherein the foaming nozzle is configured to output the meta-stable detergent based foam to a turbine engine to clean the turbine engine with the meta-stable detergent based foam.

10. The turbine cleaning system of claim 1, wherein each of the one or more aerators is directly coupled to a respective pressure regulator of the one or more pressure regulators via a respective passageway.

11. The turbine cleaning system of claim 1, wherein the one or more pressure sensors is disposed on the manifold.

12. The turbine cleaning system of claim 1, wherein a respective one of the one or more pressure sensors for a respective one of the one or more pressure regulators is disposed on a fluid passageway extending between the manifold and the one or more aerators.

13. The turbine cleaning system of claim 1, wherein the controller comprises a processor.

14. A turbine cleaning system, comprising:
a foaming nozzle comprising a foam chamber configured to receive a liquid detergent;
a manifold configured to receive an expansion gas;
a gas supply source configured to store the expansion gas;
two or more aerators fluidly coupled with the gas supply source, the foam chamber, and the manifold, and configured to pass the expansion gas to the foam chamber, wherein adjacent aerators of the two or more aerators are spaced apart by one inch or less;
two or more pressure regulators, wherein each of the two or more aerators is operably coupled to a respective pressure regulator of the two or more pressure regulators, such that the two or more aerators are configured to generate a meta-stable detergent based foam having bubbles with bubble diameters within a range of 10 microns and 5 millimeters, having a half-life within a range of 5 minutes and 180 minutes, or a combination thereof;
one or more pressure sensors configured to measure pressure of the expansion gas that is supplied to the two or more aerators; and
a controller configured to receive output from the one or more pressure sensors and configured to control operation of the two or more pressure regulators based on the output of the one or more pressure sensors.

15. The turbine cleaning system of claim 14, comprising a detergent source configured to store the liquid detergent and to pass the liquid detergent to the foaming nozzle, wherein the foaming nozzle is configured to output the meta-stable detergent based foam to a turbine engine to clean the turbine engine with the meta-stable detergent based foam.

16. The turbine cleaning system of claim 14, wherein each aerator of the two or more aerators comprises a diameter between 0.25 and 0.75 inches such that the two or more aerators are configured to generate the meta-stable detergent based foam having the bubbles with the bubble diameters within the range of 10 microns and 5 millimeters, and having the half-life within the range of 5 minutes and 180 minutes.

17. A turbine cleaning system, comprising:
 a gas supply source configured to store an expansion gas;
 a detergent source configured to store a liquid detergent; and a foaming nozzle comprising:
 a foam chamber configured to receive the liquid detergent;
 a plurality of aerators fluidly coupled with the foam chamber and configured to pass the expansion gas to the foam chamber to generate a meta-stable detergent based foam, wherein the foaming nozzle is configured to output the meta-stable detergent based foam to a turbine engine to clean the turbine engine with the meta-stable detergent based foam;
 a plurality of pressure regulators, wherein each of the plurality of aerators is operably coupled to a respective pressure regulator of the plurality of pressure regulators;
 one or more pressure sensors configured to measure pressure of the expansion gas that is supplied to the plurality of aerators; and
 a controller configured to receive output from the one or more pressure sensors and configured to control operation of the plurality of pressure regulators based on the output of the one or more pressure sensors.

18. The turbine cleaning system of claim 17, wherein each aerator of the plurality of aerators comprises a diameter between 0.25 and 0.75 inches such that the aerator is configured to generate the meta-stable detergent based foam having bubbles with bubble diameters within a range of 10 microns and 5 millimeters, having a half-life within a range of 5 minutes and 180 minutes, or a combination thereof.

19. The turbine cleaning system of claim 17, wherein adjacent aerators of the plurality of aerators are spaced apart by one inch or less such that the plurality of aerators is configured to generate the meta-stable detergent based foam having bubbles with bubble diameters within a range of 10 microns and 5 millimeters, having a half-life within a range of 5 minutes and 180 minutes, or a combination thereof.

20. The turbine cleaning system of claim 17, wherein each aerator of the plurality of aerators comprises a diameter between 0.25 and 0.75 inches and adjacent aerators of the plurality of aerators are spaced apart by one inch or less, such that the plurality of aerators is configured to generate the meta-stable detergent based foam having bubbles with bubble diameters within a range of 10 microns and 5 millimeters, and having a half-life within a range of 5 minutes and 180 minutes.

* * * * *